United States Patent [19]
Rosch et al.

[11] Patent Number: 5,258,713
[45] Date of Patent: Nov. 2, 1993

[54] IMPEDANCE GENERATOR FOR A TELEPHONE LINE INTERFACE CIRCUIT

[75] Inventors: Reinhard W. Rosch, Richmond; Graeme B. Boyd, Dunrobin; Mark P. J. Feeley, Kanata, all of Canada

[73] Assignee: Northern Telecom Limited, Montreal, Canada

[21] Appl. No.: 868,940

[22] Filed: Apr. 16, 1992

[51] Int. Cl.$^5$ .......................... H04B 3/30; H04B 3/40
[52] U.S. Cl. .................... 328/159; 328/160; 307/527; 379/394; 379/398
[58] Field of Search ............. 379/394, 398, 400, 403; 307/520, 521, 529; 328/159, 160, 167

[56] References Cited
U.S. PATENT DOCUMENTS

| | | | |
|---|---|---|---|
| 3,537,015 | 10/1970 | Jackson | 328/160 |
| 3,638,037 | 1/1972 | McMurtrie | 307/520 |
| 4,004,102 | 1/1977 | Ott | 379/398 |
| 4,011,530 | 3/1977 | Carver | 379/398 |
| 4,086,540 | 4/1978 | Delagrange | 328/160 |
| 4,317,963 | 3/1982 | Chea, Jr. | 379/377 |
| 4,387,273 | 6/1983 | Chea, Jr. | 379/398 |
| 4,433,213 | 2/1984 | Albers et al. | 379/400 |
| 4,484,032 | 11/1984 | Rosenbaum | 379/345 |
| 4,764,956 | 8/1988 | Rosch et al. | 379/413 |
| 4,866,767 | 9/1989 | Tanimoto et al. | 379/398 |

FOREIGN PATENT DOCUMENTS

0112731 7/1984 European Pat. Off. .

OTHER PUBLICATIONS

Muller, K. F. "Impedanz— und Symmetrieverhalten der analogen Teilnehmeranschlussschaltung", Nachrichtentechnik Elektronik vol. 39, No. 4, pp. 126–128, XP66762, Berlin, 1989.
Patent Abstracts of Japan, vol. 009, No. 274 (E-354), Oct. 31, 1985 and JP,A 60 117 989 (Nippon Denki KK), Jun. 25, 1985.

*Primary Examiner*—John S. Heyman
*Assistant Examiner*—Shawn Riley
*Attorney, Agent, or Firm*—R. John Haley

[57] ABSTRACT

An impedance generator, especially suitable for determining a terminating impedance of an active impedance telephone line interface circuit, comprises a subtracting circuit for forming a difference between an input voltage multiplied by a multiplier and a high pass filtered version of the difference multiplied by another multiplier, and a summing circuit for combining the input voltage multiplied by a further multiplier with a low pass filtered version of said difference to produce an output voltage. In one arrangement, the input voltage multiplied by the further multiplier constitutes a third input to the subtracting circuit. The high pass filtered version of the difference is produced by subtracting the output of a low pass filter from the difference. The multipliers are constituted by controllable gain elements, enabling the generated impedance to be easily programmed under digital control.

30 Claims, 2 Drawing Sheets

IMPEDANCE GENERATOR FOR A TELEPHONE LINE INTERFACE CIRCUIT

This invention relates to impedance generators, and is particularly but not exclusively concerned with an impedance generator for use in a line interface circuit for a telecommunications line. Line interface circuits are commonly connected to two-wire telephone subscriber lines at a telephone central office or remote terminal in order to provide a variety of well-known desired functions.

CROSS-REFERENCE TO RELATED APPLICATIONS

Reference is directed to U.S. patent application Ser. No. 07/868,941 filed simultaneously herewith in the names of Rosch et al. and entitled "Wideband Telephone Line Interface Circuit", and also to U.S. patent application Ser. No. 07/868,893 filed simultaneously herewith in the names of Rosch et al. and entitled "Telephone Line Interface Circuit With Voltage Control". The entire disclosure of each of these applications is hereby incorporated herein by reference.

BACKGROUND OF THE INVENTION

Various forms of line interface circuit, and various desirable features in line interface circuits, are known. In particular, it is known for example from Rosenbaum U.S. Pat. No. 4,484,032 issued Nov. 20, 1984 and entitled "Active Impedance Transformer Assisted Line Feed Circuit" to provide a line interface circuit in which two amplifiers have their outputs coupled to the tip and ring wires of a two-wire telephone line via feed resistors and primary windings of a very small transformer. In this arrangement, a secondary winding of the transformer and a resistive network coupled to the feed resistors provide for sensing of a.c. and d.c. conditions on the line.

In addition, it is known from Rosch et al. U.S. Pat. No. 4,764,956 issued Aug. 16, 1988 and entitled "Active Impedance Line Feed Circuit" to cancel common mode signals and to provide a substantially constant threshold for ground fault current limiting in a line interface circuit.

With evolution of telephone systems, it is desirable to provide improved line interface circuits which in particular have a bandwidth which is sufficiently great to accommodate ISDN (integrated services digital network) services, for example a signal bandwidth of the order of 200 kHz. At the same time, it is desirable to provide improvements in line interface circuits with respect to such features as their size, cost, versatility, and operation especially in relation to fault conditions, common mode signal rejection, and power consumption and dissipation.

Considered generally, there is a need for a line interface circuit which can be used to operate in conjunction with any arbitrary telephone communications line to provide arbitrary voice and data communications services as may be desired at any particular time, which services can be readily changed under software control from a telephone central office processor without requiring any hardware changes of the line interface circuit.

Such a line interface circuit must be able to terminate, and be matched to, lines of various resistive and complex impedances. For example, two-wire telephone lines in North America have terminating impedances of 600 or 900 $\Omega$, with or without a capacitive component of 2.16 $\mu$F. Other terminating impedances are used in other countries, and for digital loop services.

In known active impedance line interface circuits, a desired terminating impedance may be generated using a scaled model of the desired impedance or its inverse. A scaled model of the desired impedance is generated by connecting a network having the same topology as the desired impedance in the feedback path of an amplifier circuit, while the inverse is generated by connecting the network in a feed-forward path of an amplifier circuit.

This known technique has disadvantages in that different circuit topologies are required to generate an impedance and its inverse, so that it is not convenient to generate either of these in a selective manner as is desirable for a single line interface circuit to be used in a wide variety of situations. In addition, components are generally connected between amplifier inputs and outputs, so that they must be floating with respect to ground, making the circuit design more difficult than one in which one terminal of the components is grounded. Furthermore, programmability to generate various impedances is achieved using a number of reference components and multipliers, with the result that all of the reference components must track one another in value.

Thus although a single design of line interface circuit for use with any of a variety of lines requiring widely different terminating impedances is desirable, the prior art falls short of enabling this in a practical manner.

An object of this invention is to provide an improved impedance generator, which is especially suitable for use in an active impedance line interface circuit for a communications line and which facilitates implementation in an integrated circuit form.

SUMMARY OF THE INVENTION

According to one aspect of this invention there is provided an impedance generator comprising: means for forming a difference between an input voltage multiplied by a multiplier and a high pass filtered version of the difference multiplied by another multiplier; and means for combining the input voltage multiplied by a further multiplier with a low pass filtered version of said difference to produce an output voltage.

In one embodiment of the invention described below, the means for forming a difference comprises means for adding the input voltage multiplied by the further multiplier to the high pass filtered version of the difference multiplied by said another multiplier. In another embodiment, the means for combining comprises summing means or subtracting means for respectively adding the low pass filtered version of said difference to, or subtracting it from, the input voltage multiplied by the further multiplier.

In each embodiment, preferably each multiplier comprises a gain element having a controlled gain, whereby the generated impedance can be easily varied or programmed in a desired manner. Each gain element can conveniently comprise an amplifier or attenuator with switched resistors which determine the gain of the amplifier or attenuator.

In order to provide the desired filtering with only a single filter of simple design, preferably the means for forming a difference comprises means for low pass filtering said difference to produce the low pass filtered version of said difference, and means for subtracting the low pass filtered version of said difference from said difference to produce the high pass filtered version of said difference. The means for low pass filtering can conveniently comprise a series resistance followed by a shunt capacitance and a buffer amplifier having an input connected to a junction between the resistance and capacitance.

According to another aspect this invention provides an impedance generator comprising: first, second, and third multiplying means each having an input and an output, the input of each of the first and second multiplying means being connected to an input of the impedance generator; summing means having a first input connected to the output of the first multiplying means, a second input, and an output constituting an output of the impedance generator; subtracting means having two inputs, connected respectively to the outputs of the second and third multipliers, and an output; and filtering means having an input coupled to the output of the subtracting means, a high pass filter output connected to the input of the third multiplying means, and a low pass filter output connected to the second input of the summing means.

Preferably each of the multiplying means comprises a gain element having a controlled gain. The subtracting means can comprise a third input connected to the output of the first multiplying means, for summing the output of the first multiplying means with the output of the third multiplying means. Desirably the filtering means comprises a low pass filter, having an input constituting the input of the filtering means and an output constituting said low pass filter output, and subtracting means having two inputs connected respectively to the input of the filtering means and the low pass filter output and having an output constituting said high pass filter output. However, it is observed that the filtering means could instead comprise a high pass filter whose output is subtracted from its input to produce the low pass filter output. The filtering means could alternatively comprise separate low pass and high pass filter sections.

The invention also provides a method of generating an impedance comprising the steps of: forming a difference between an input voltage multiplied by a multiplier and a high pass filtered version of the difference multiplied by another multiplier; and combining the input voltage multiplied by a further multiplier with a low pass filtered version of said difference to produce an output voltage.

In order to make the generated impedance controllable or programmable, the method preferably includes the step of controlling the multipliers. Preferably also the step of forming a difference comprises low pass filtering said difference to produce the low pass filtered version of said difference, and subtracting the low pass filtered version of said difference from said difference to produce the high pass filtered version of said difference.

In one embodiment of the method, the step of forming a difference comprises adding the input voltage multiplied by the further multiplier to the high pass filtered version of the difference multiplied by said another multiplier.

BRIEF DESCRIPTION OF THE DRAWINGS

The invention will be further understood from the following description with reference to the accompanying drawings, in which.

DETAILED DESCRIPTION

Figure 1:
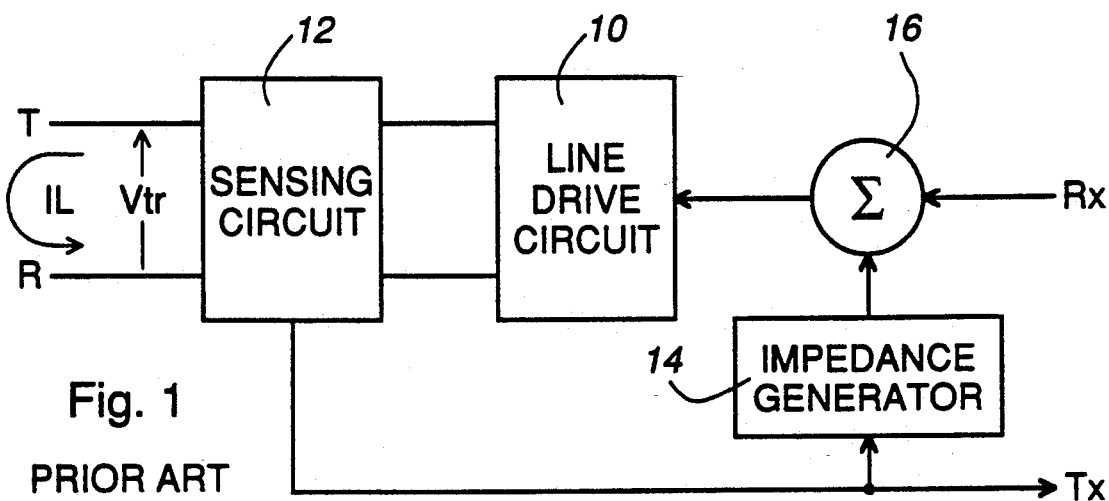
FIG. 1 is a block diagram illustrating a known arrangement of an active impedance telephone line interface circuit.

Referring to FIG. 1, there is illustrated a block diagram showing components of an active impedance telephone line interface circuit, which is typically part of a telephone central office or CO. These components comprise a line drive circuit 10, a sensing circuit 12 via which the line drive circuit 10 is coupled to the tip wire T and the ring wire R of a telephone line, an impedance generator 14, and a summing circuit 16. The sensing circuit 12 produces a signal Tx on a transmit path to the CO and also supplies this to the impedance generator 14, whose output is summed by the summing circuit 16 with a signal Rx on a receive path from the CO, the result being supplied via the line drive circuit 10 and the sensing circuit 12 to the tip and ring wires of the line. The feedback via the impedance generator 14 modifies the signal appearing on the tip and ring wires to provide the telephone line with a desired terminating impedance.

The line drive circuit 10 and the sensing circuit 12 can be of known form, and for example the arrangement can be as described in U.S. Pat. No. 4,764,956 already referred to, the impedance generator 14 constituting the a.c. network 78 of that patent and primarily determining the impedance presented by the line interface circuit to the telephone line. However, these circuits are desirably of the form described and claimed in the related patent applications filed simultaneously herewith and already referred to.

The line drive circuit 10 operates in a conventional manner to drive the tip and ring wires T and R in a balanced manner with the receive path signal Rx, and optionally to provide d.c. feed to the telephone line. The sensing circuit 12, which for example can include a known resistor network coupled to feed resistors in series with the tip and ring wires, also operates in known manner.

The sensing circuit 12 can produce as the feedback signal to the impedance generator 14 a signal representing either the loop current IL flowing differentially in the tip and ring wires, or the voltage Vtr between the tip and ring wires. If the sensing circuit 12 produces a signal representing the loop current IL, then the impedance generator 14 is required to produce at its output a voltage Vo determined by the equation $Vo = IL \times Zg$, where Zg is the transfer function of the impedance generator and has the characteristics of the desired line terminating impedance. This voltage, when fed back to the line drive circuit 10 and applied to the tip and ring wires with the correct phase, results in a terminating impedance $Z = Vo/IL = Zg$. If alternatively the sensing circuit 12 produces a signal representing the voltage Vtr, then the impedance generator 14 is required to produce at its output a current Io determined by the equation Io=Vtr/Zg, and in this case 1/Zg is the transfer function of the impedance generator. This current, when fed back to the tip and ring wires via the line drive circuit 10, results in a terminating impedance Z=Vtr/Io=Zg.

Thus for versatile operation in arbitrary situations, the impedance generator 14 is required selectively to generate either the desired terminating impedance itself or the inverse of this impedance. In practice, known scaling techniques can be used so that the impedances to be generated can be provided using components of convenient magnitudes, for example small capacitances and large resistances, to facilitate low power dissipation, optimum noise performance or dynamic range, and integration of the impedance generator together with other components, such as a coder/decoder and control circuitry, in an integrated circuit.

Using such known scaling techniques, if the sensing circuit 12 output signal is a current representing the loop current IL, then the function of the impedance generator 14 is to apply this current to a properly scaled replica of the desired line terminating impedance, and to feed the resulting output voltage to voltage drivers to oppose the current in the tip and ring wires, resulting in the desired terminating impedance. Conversely, if the sensing circuit 12 output signal is a voltage representing the voltage Vtr, then the function of the impedance generator 14 is to apply this voltage to a properly scaled replica of the inverse of the desired line terminating impedance, and to force the resulting output current to flow in the tip and ring wires, again resulting in the desired terminating impedance.

Figure 2:
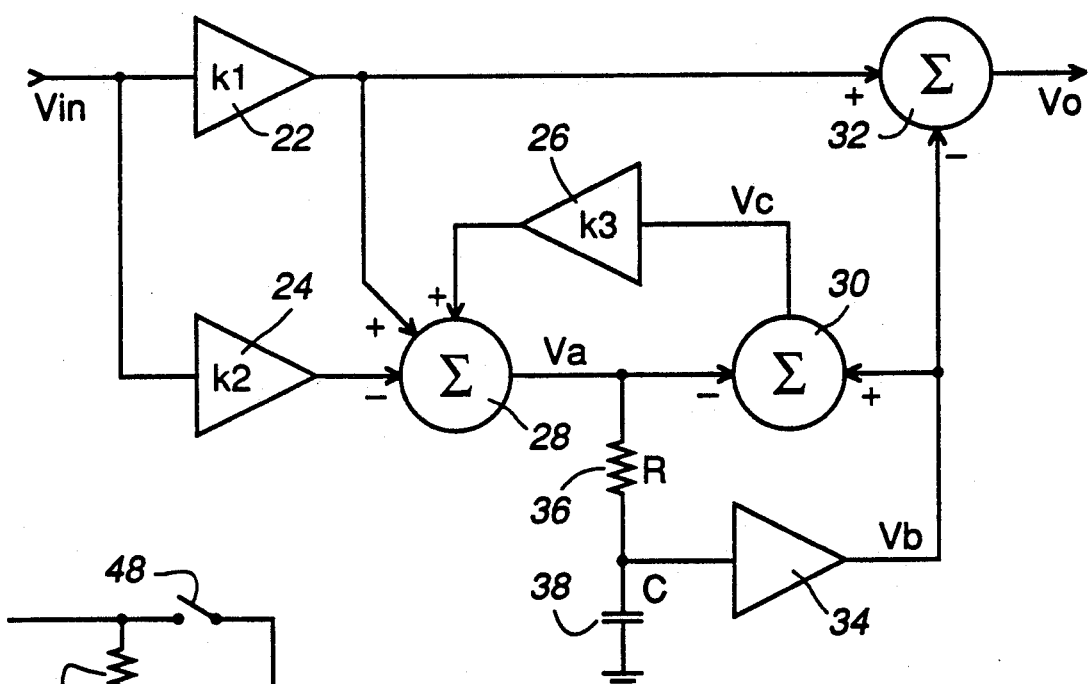
FIG. 2 is a circuit diagram illustrating an impedance generator in accordance with an embodiment of this invention.

FIG. 2 illustrates an impedance generator in accordance with an embodiment of this invention, which can conveniently be used to constitute the impedance generator 14.

Referring to FIG. 2, the impedance generator circuit illustrated therein has an input for an input voltage Vin and an output at which it produces an output voltage Vo, and comprises three gain elements 22, 24, and 26; three summing circuits 28, 30, and 32; a fixed gain buffer 34; a series resistor 36 having a resistance R; and a shunt capacitor 38 having a capacitance C. The gain elements 22, 24, and 26 have gains of k1, k2, and k3 respectively, each of which gains may be greater than one (amplification) or less than one (attenuation). Thus the term "gain element" as used herein is intended to include both amplifiers and attenuators. In the following description it is assumed for convenience of calculation that the buffer 34 has unity gain, but this need not necessarily be the case.

Figure 3:
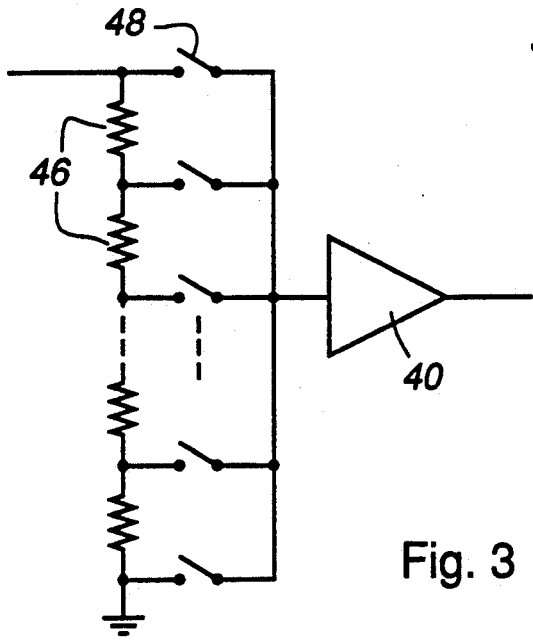
FIG. 3 is a circuit diagram illustrating a possible form of a programmable gain element used in the impedance generator.

By way of example, each of the elements 22, 24, and 26 can conveniently be a programmable gain element having the form of the attenuator circuit illustrated in FIG. 3, comprising a buffer 40, a plurality of resistors 46 connected in series and forming a potential divider between the input of the gain element and ground, and switches 48 each connected between a respective tap of the potential divider and the input of the buffer 40. The switches 48 are controlled, for example by digital control signals supplied from the telephone CO, to determine the attenuation of the circuit. In this manner, the parameters k1, k2, and k3 can be controlled in a programmable manner as desired. The attenuation of the gain elements can be compensated by amplification of the voltage Vin.

Alternatively, the gain elements can be constituted by amplifier circuits having switched resistors to provide programmable gains.

As shown in FIG. 2, each of the gain elements 22 and 24 is supplied with the input voltage Vin, and the gain element 26 is supplied with a voltage Vc constituted by the output of the summing circuit 30. The summing circuit 28 is arranged to add the outputs of the gain elements 22 and 26 and to subtract the output of the gain element 24 to produce a voltage Va which is coupled to the input of the buffer 34 via the resistor 36. The buffer 34 also has its input coupled to ground via the capacitor 38, and produces at its output a voltage Vb. The summing circuit 30 is arranged to subtract the voltage Va from the voltage Vb to produce the voltage Vc, and the summing circuit 32 is arranged to subtract the voltage Vb from the output of the gain element 22 to produce the output voltage Vo.

The output voltage Vb of the buffer 34 is given by Vb=Va×Pf, where Pf is the low pass function 1/(RCs+1), and s represents a complex component equal to j2πf for a sinusoidal signal of frequency f. As Vc=Vb−Va, and Va=Vin (k1−k2)+k3 Vc, it can be determined that Va=Vin (k1−k2)/(1+k3−k3 Pf). The output voltage Vo is given by the equation Vo=k1 Vin−Vb=k1 Vin−Va Pf, and substituting for Va and Pf and rearranging gives the transfer function of the impedance generator, expressed by the equation Vo=k2 Vin {1+(k1/k2)(1+k3)RCs}/{1+(1+k3)RCs}.

It should be appreciated that this transfer function has the form of a first order, single pole, single zero response, with a pole frequency fp and a zero frequency fz given by the equations 1/fp=(1+k3)RC and 1/fz=(k1/k2)(1+k3)RC, a d.c. gain of k2, and a gain at high frequencies of k1. From the equations for fp and fz it can be seen that fz=(k2/k1)fp.

Thus the parameters k1, k2, and k3 can be set, under digital programmable control as described above, to determine respectively and independently the high frequency gain, the d.c. gain, and the pole frequency fp of the impedance generator. The transition between d.c. gain and high frequency gain is at the rate of 20 dB per decade (first order response), referenced to the pole frequency fp. The terminating impedance which is presented to the telephone line using the impedance generator in the arrangement of FIG. 1 is capacitive if k2>k1, inductive if k2<k1, and purely resistive, as is often desired for telephone applications, if k1=k2.

Figure 4:
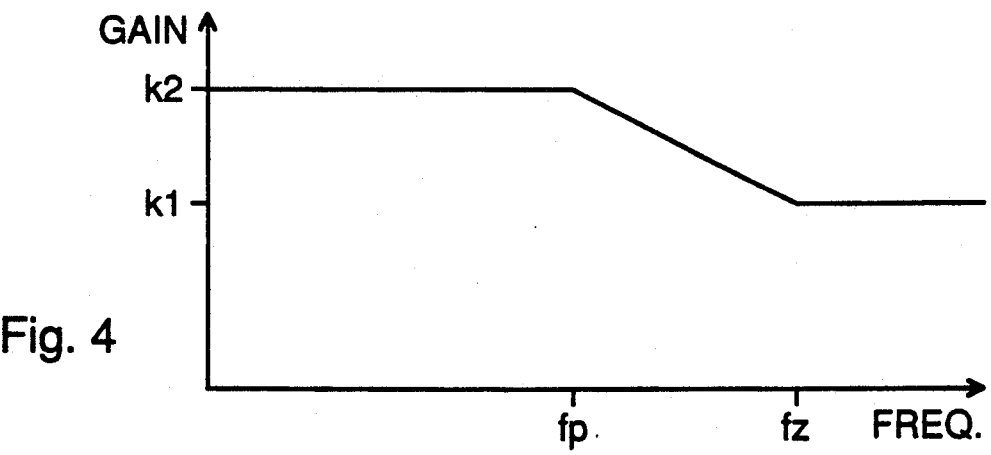
FIGS. 4 and 5 are Bode plot diagrams illustrating alternative characteristics of the impedance generator of FIG. 2.
Figure 5:
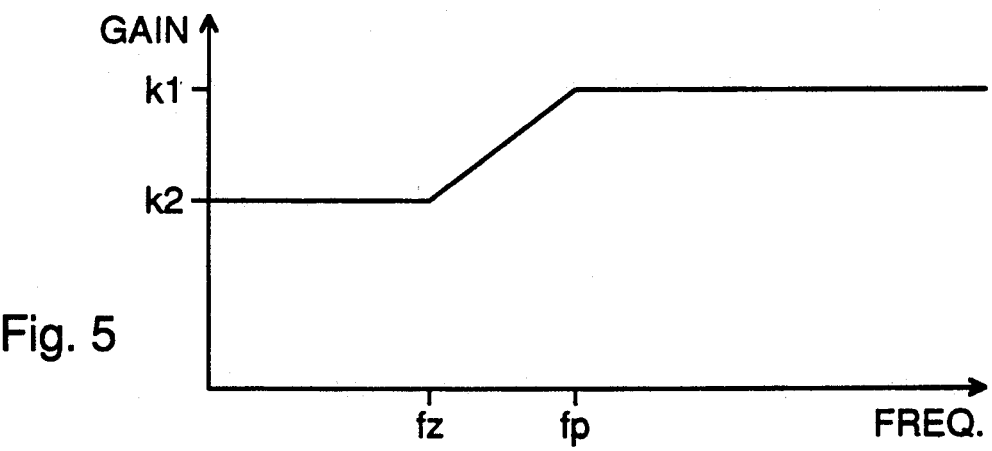

FIGS. 4 and 5 show, in the form of Bode plot diagrams of gain versus frequency, alternative transfer functions of the impedance generator of FIG. 2 depending on the relative values of the parameters k1 and k2, assuming the same value of k3 and hence the same pole frequency fp. The transfer function of FIG. 4 corresponds to the provision of a capacitive line terminating impedance constituted by a resistance Rs in series with a parallel combination of a capacitance and another resistance Rp. In this case k1<k2, so that fz>fp. Conversely, the transfer function of FIG. 5 corresponds to the provision of an inductive line terminating impedance constituted by a resistance Rs in series with a parallel combination of an inductance and another resistance Rp. In this case k1>k2, so that fz<fp. In each case the change in gain between the frequencies fz and fp is at a rate of 20 dB per decade. It can be seen that if k1=k2, then fz=fp and the transfer function is flat, i.e. the gain is constant with changing frequency, corresponding to a purely resistive line terminating impedance.

Figure 6:
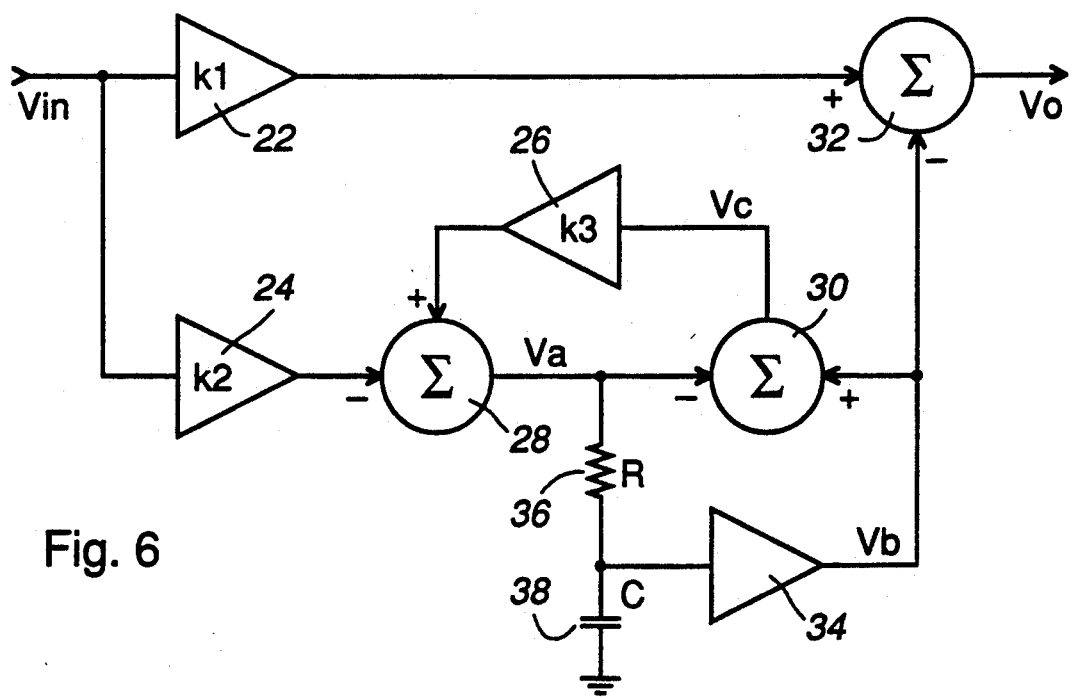
FIG. 6 is a circuit diagram illustrating an impedance generator in accordance with another embodiment of this invention.

FIG. 6 illustrates, using the same references as above, an alternative form of the impedance generator in which the circuit is the same as that of FIG. 2 except that the output from the gain element 22 to an input of the summing circuit 28 is omitted. This has the advantage that the summing circuit 28 has only two inputs, and accordingly can be easier to design and incorporate in an integrated circuit.

In the circuit of FIG. 6, the output voltage Vb of the buffer 34 is again given by $Vb=Va \times Pf$, where $Pf=1/(RCs+1)$, and again $Vc=Vb-Va$. In the circuit of FIG. 6 $Va=k3\ Vc-k2\ Vin$, from which $Va=-k2\ Vin/(1+k3-k3\ Pf)$. The output voltage Vo is again $Vo=k1\ Vin-Vb=k1\ Vin-Va\ Pf$, and substituting for Va and Pf and rearranging gives the transfer function of the impedance generator circuit of FIG. 6, which is $Vo=(k1+k2)\ Vin\ \{1+[k1/(k1+k2)](1+k3)RCs\}/\{1+k3)\ RCs\}$.

Again, this transfer function has the form of a first order, single pole, single zero response, with a pole frequency fp and a zero frequency given by the equations $1/fp=(1+k3)\ RC$ and $1/fz=[k1/(k1+k2)](1+k3)\ RC$, a d.c. gain of $k1+k2$, and a gain at high frequencies of k1. From the equations for fp and fz it can be seen that $fz=((k1+k2)/k1)\ fp$.

The circuit of FIG. 6 can be easier to program than that of FIG. 2, in that in the circuit of FIG. 6 there is a direct correspondence between the gains k1 and k2 and the resistances of the line terminating impedance. More specifically, the series resistance Rs referred to above is directly proportional to k1, and the parallel resistance Rp referred to above is directly proportional to k2. In addition, the line terminating impedance generated using the circuit of FIG. 6 becomes purely resistive when $k2=0$, so that a purely resistive termination is obtainable accurately simply by opening the input voltage path to the summing circuit 28 via the gain element 24.

The circuit of FIG. 6 is less convenient than that of FIG. 2 for changing between the capacitive terminating impedance represented by the transfer function of FIG. 4 and the inductive terminating impedance represented by the transfer function of FIG. 5. As described above, the circuit of FIG. 6 produces the capacitive terminating impedance response of FIG. 4, because the d.c. gain of $k1+k2$ is greater than the high frequency gain of k1 for positive values of k2, so that the impedance generator provides greater feedback, in the arrangement of FIG. 1, at d.c. than at high frequencies. An inductive terminating impedance response as in FIG. 5 can be produced by switching the voltage Vb to an additive input (+) of the summing circuit 32, rather than supplying it to a substractive input (−) as shown in FIG. 6 and as described above. Alternatively, the same result can be achieved by switching at the gain element 24 to provide a gain of −k2, the minus sign representing an inversion, instead of a gain of k2 without inversion as illustrated and described above.

It can be seen from the preceding description that, in each of the circuits of FIGS. 2 and 6, the voltage Vb is a variable low pass filtered version of the voltage Va, produced by low pass filtering using the components 36 and 38 and buffering in the buffer 34, and this is substracted in the summing circuit 30 from the voltage Va to produce the voltage Vc which accordingly represents a high pass version of the voltage Va. It should be appreciated, therefore, that the voltage Vc could instead be produced by variable high pass filtering of the voltage Va, and as a further option the voltage Vb could instead be produced by substracting such a variable high pass filtered voltage Vc from the voltage Va. However, this is less desirable than the low pass arrangement illustrated and described above in view of other considerations such as noise associated with the gain elements at high frequencies, and the more ready availability of capacitors than inductors which would be required for high pass filtering.

Viewed in this manner, and considering the gain elements as multipliers, the summing circuit 28 subtracts the input voltage Vin multiplied by k2 from a high pass filtered version of its output multiplied by k3, and optionally (in the case of FIG. 2) adds the input voltage Vin multiplied by k1. The summing circuit 32 subtracts (or optionally adds in the case of FIG. 6) a low pass filtered version of the output of the summing circuit 28 from (to) the input voltage Vin multiplied by k1, to produce the output voltage Vo.

It should also be appreciated that filters of higher order than the first order filter described above can be used, with a corresponding increase in the order of the resulting generated impedance characteristic.

Although particular embodiments of the invention have been described in detail, it should be appreciated that numerous modifications, variations, and adaptations may be made without departing from the scope of the invention as defined in the claims.

What is claimed is:

1. An impedance generator comprising:
   means for forming a difference between an input voltage multiplied by a multiplier and a high pass filtered version of the difference multiplied by another multiplier; and
   means for combining the input voltage multiplied by a further multiplier with a low pass filtered version of said difference to produce an output voltage.

2. An impedance generator as claimed in claim 1 wherein each multiplier comprises a gain element having a controlled gain.

3. An impedance generator as claimed in claim 1 wherein the means for forming a difference comprises means for low pass filtering said difference to produce the low pass filtered version of said difference, and means for subtracting the low pass filtered version of said difference from said difference to produce the high pass filtered version of said difference.

4. An impedance generator as claimed in claim 3 wherein the means for low pass filtering comprises a series resistance followed by a shunt capacitance and a buffer amplifier having an input connected to a junction between the resistance and capacitance.

5. An impedance generator as claimed in claim 3 wherein each multiplier comprises a gain element having a controlled gain.

6. An impedance generator as claimed in claim 1 wherein the means for forming a difference comprises means for adding the input voltage multiplied by the further multiplier to the high pass filtered version of the difference multiplied by said another multiplier.

7. An impedance generator as claimed in claim 6 wherein each multiplier comprises a gain element having a controlled gain.

8. An impedance generator as claimed in claim 6 wherein the means for forming a difference comprises means for low pass filtering said difference to produce the low pass filtered version of said difference, and means for subtracting the low pass filtered version of said difference from said difference to produce the high pass filtered version of said difference.

9. An impedance generator as claimed in claim 8 wherein the means for low pass filtering comprises a series resistance followed by a shunt capacitance and a buffer amplifier having an input connected to a junction between the resistance and capacitance.

10. An impedance generator as claimed in claim 8 wherein each multiplier comprises a gain element having a controlled gain.

11. An impedance generator as claimed in claim 1 wherein the means for combining comprises summing means for adding the low pass filtered version of said difference to the input voltage multiplied by the further multiplier.

12. An impedance generator as claimed in claim 11 wherein each multiplier comprises a gain element having a controlled gain.

13. An impedance generator as claimed in claim 11 wherein the means for forming a difference comprises means for low pass filtering said difference to produce the low pass filtered version of said difference, and means for subtracting the low pass filtered version of said difference from said difference to produce the high pass filtered version of said difference.

14. An impedance generator as claimed in claim 13 wherein the means for low pass filtering comprises a series resistance followed by a shunt capacitance and a buffer amplifier having an input connected to a junction between the resistance and capacitance.

15. An impedance generator as claimed in claim 13 wherein each multiplier comprises a gain element having a controlled gain.

16. An impedance generator as claimed in claim 1 wherein the means for combining comprises subtracting means for subtracting the low pass filtered version of said difference from the input voltage multiplied by the further multiplier.

17. An impedance generator as claimed in claim 16 wherein the means for forming a difference comprises means for low pass filtering said difference to produce the low pass filtered version of said difference, and means for subtracting the low pass filtered version of said difference from said difference to produce the high pass filtered version of said difference.

18. An impedance generator as claimed in claim 17 wherein the means for low pass filtering comprises a series resistance followed by a shunt capacitance and a buffer amplifier having an input connected to a junction between the resistance and capacitance.

19. An impedance generator as claimed in claim 17 wherein each multiplier comprises a gain element having a controlled gain.

20. An impedance generator comprising:
first, second, and third multiplying means each having an input and an output, the input of each of the first and second multiplying means being connected to an input of the impedance generator;
summing means having a first input connected to the output of the first multiplying means, a second input, and an output constituting an output of the impedance generator;
subtracting means having two inputs, connected respectively to the outputs of the second and third multipliers, and an output; and
filtering means having an input coupled to the output of the subtracting means, a high pass filter output connected to the input of the third multiplying means, and a low pass filter output connected to the second input of the summing means.

21. An impedance generator as claimed in claim 20 wherein each of the multiplying means comprises a gain element having a controlled gain.

22. An impedance generator as claimed in claim 20 wherein the subtracting means comprises a third input connected to the output of the first multiplying means, for summing the output of the first multiplying means with the output of the third multiplying means.

23. An impedance generator as claimed in claim 22 wherein each of the multiplying means comprises a gain element having a controlled gain.

24. An impedance generator as claimed in claim 20 wherein the filtering means comprises a low pass filter, having an input constituting the input of the filtering means and an output constituting said low pass filter output, and subtracting means having two inputs connected respectively to the input of the filtering means and the low pass filter output and having an output constituting said high pass filter output.

25. An impedance generator as claimed in claim 24 wherein each of the multiplying means comprises a gain element having a controlled gain.

26. An impedance generator as claimed in claim 24 wherein the subtracting means comprises a third input connected to the output of the first multiplying means, for summing the output of the first multiplying means with the output of the third multiplying means.

27. An impedance generator as claimed in claim 26 wherein each of the multiplying means comprises a gain element having a controlled gain.

28. A method of generating an impedance comprising the steps of:
forming a difference between an input voltage multiplied by a multiplier and a high pass filtered version of the difference multiplied by another multiplier; and
combining the input voltage multiplied by a further multiplier with a low pass filtered version of said difference to produce an output voltage.

29. A method as claimed in claim 28 wherein the step of forming a difference comprises adding the input voltage multiplied by the further multiplier to the high pass filtered version of the difference multiplied by said another multiplier.

30. A method as claimed in claim 28 wherein the step of forming a difference comprises low pass filtering said difference to produce the low pass filtered version of said difference, and subtracting the low pass filtered version of said difference from said difference to produce the high pass filtered version of said difference.

* * * * *